United States Patent [19]

Becker

[11] 4,181,038

[45] Jan. 1, 1980

[54] DEVICE FOR DAMPING VIBRATIONS IN ROTORS OF TURBOMACHINES

[75] Inventor: Bernard Becker, Mulheim, Fed. Rep. of Germany

[73] Assignee: Kraftwerk Union Aktiengesellschaft, Mulheim, Fed. Rep. of Germany

[21] Appl. No.: 918,722

[22] Filed: Jun. 26, 1978

[30] Foreign Application Priority Data

Jun. 29, 1977 [DE] Fed. Rep. of Germany ....... 2729340

[51] Int. Cl.² ............................................. F16F 15/14
[52] U.S. Cl. ..................................................... 74/574
[58] Field of Search .......................... 74/574; 188/1 B

[56] References Cited

U.S. PATENT DOCUMENTS

| | | | |
|---|---|---|---|
| 1,158,555 | 11/1915 | Prescott | 74/574 |
| 1,799,987 | 4/1931 | Raven | 74/574 |
| 3,049,941 | 8/1962 | Rumsey | 74/574 |
| 3,105,392 | 10/1963 | Rumsey | 74/574 |
| 4,083,265 | 4/1978 | Bremer, Jr. | 74/574 |

Primary Examiner—Kenneth J. Dorner
Attorney, Agent, or Firm—Herbert L. Lerner

[57] ABSTRACT

Device for damping vibrations in a rotating turbomachine rotor is formed of an assembly of a plurality of centrally apertured rotor discs force-lockingly clamped together by a tie-rod passing through the apertures of the rotor discs and damping elements disposed in a ring slot formed between the tie-rod and the inner periphery of the rotor discs, the damping elements being actuatable for damping vibrations in the rotor in dependence upon centrifugal force generated by the rotating rotor. The damping elements are formed of ring segments uniformly distributed peripherally in the ring slot and having discrete, strip-like contact surfaces at radially inner and outer peripheral surfaces thereof, the contact surfaces being in contact with the tie-rod and the rotor discs, respectively, the contact surfaces being spaced from one another in longitudinal direction of the respective damping elements and in a region of the respective damping elements beyond which the center of gravity of the respective damping elements is located.

10 Claims, 9 Drawing Figures

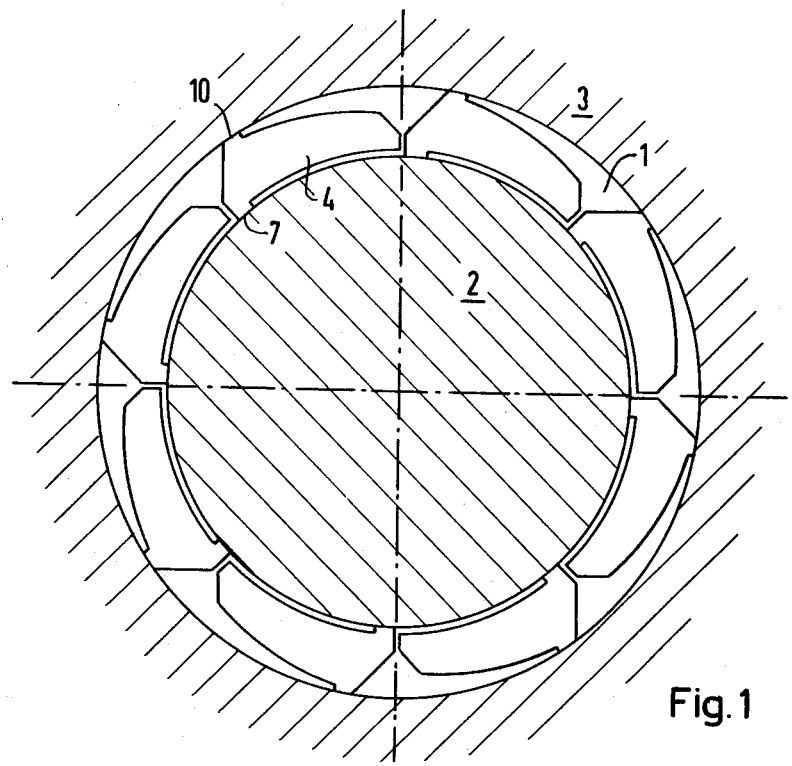
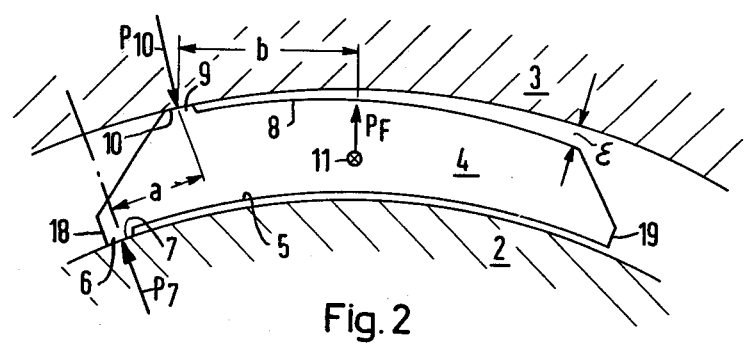
Fig. 1
Fig. 2

DEVICE FOR DAMPING VIBRATIONS IN ROTORS OF TURBOMACHINES

The invention relates to a device for damping vibrations in turbomachine rotors which are made up of several rotor discs force-lockingly clamped together by a tie rod passing therethrough, and which are provided, in the ring slot between the tie rod and the inner periphery of the rotor discs, with damping elements acting in dependence upon centrifugal force.

Such a device has become known heretofore from the German Patent DE-PS No. 2 034 088 wherein, between the tie rod and the rotor discs, axially divided shells are disposed which expand or widen under the action of centrifugal force and effect contact between the tie-rod and the rotor discs when the machine is in operation. Such a force-locking connection between the tie-rod and the rotor discs is necessary, since the discs expand under the action of the centrifugal force, but the diameter of the tie-rod, however, is reduced by transverse contraction. Since the thermal expansions of the rotor discs, connecting elements and tie-rod are not equal and, in addition, axial displacements occur, the damping element must bridge considerable slot variations without losing firm contact with one or both parts. In the heretofore known device, the contact pressure at least at one contact surface is obtained by deformation of the damping element under the action of centrifugal force. Since part of the centrifugal force is used up for effecting this deformation, or the permissible or possible deformation is limited, the remaining residual contact pressure can be completely consumed during rapid temperature changes or low speed, and the damping can thereby become temporarily ineffective.

It is therefore an object of the invention to provide a device for damping vibrations in turbomachine rotors, wherein force effects are produced which are nearly independent of deformations and slot variations.

With the foregoing and other objects in view, there is provided in accordance with the invention, a device for damping vibrations in a rotating turbomachine rotor formed of an assembly of a plurality of centrally apertured rotor discs force-lockingly clamped together by a tie-rod passing through the apertures of the rotor discs and damping elements disposed in a ring slot formed between the tie-rod and the inner periphery of the rotor discs, the damping elements being actuatable for damping vibrations in the rotor in dependence upon centrifugal force generated by the rotating rotor, the improvement wherein the damping elements are formed of ring segments uniformly distributed peripherally in the ring slot and having discrete, strip-like contact surfaces at radially inner and outer peripheral surfaces thereof, the contact surfaces being in contact with the tie-rod and the rotor discs, respectively, the contact surfaces being spaced from one another in longitudinal direction of the respective damping elements and in a region of the respective damping elements beyond which the center of gravity of the respective damping elements is located.

In accordance with another feature of the invention, the contact surfaces are spaced apart a distance smaller than the distance at which the center of gravity of the damping element is spaced from the radially outer contact surface.

In accordance with a further feature of the invention, the damping elements narrow down to a free end thereof so that, solely at an upper side of the damping elements, a radial gap increasing in width toward the free end is formed between the damping elements and the rotor discs.

Due to the foregoing construction of the damping elements, centrifugal force is applied outside or beyond the region in which the contact surfaces are located, namely at the center of gravity of the damping elements, and the latter thus press against the respective rotor disc as well as against the tie-rod, both contact pressures or forces being greater than the centrifugal force. Since the centrifugal acceleration in turbomachines is very much greater than the acceleration due to gravity, very great contact pressure or forces can accordingly be attained for a comparatively small weight of the damping elements.

Two basically different embodiments of the invention, both operating on the same principle, are possible. Thus, in accordance with a specific feature of the invention the contact surfaces are formed by extensions projecting in radial direction and extending over the width of the respective damping elements, the extensions being offset from one another in peripheral direction of the respective damping elements, the radially inner extension being spaced from the center of gravity a greater distance than is the radially outer extension.

In accordance with an alternate feature of the invention, the contact surfaces extend in peripheral direction of the damping elements and are formed at the radially inner side of the respective damping elements by an encircling collar on the tie-rod disposed at one end of the respective damping elements, and at the radially outer side of the respective damping elements by a projection extending in peripheral direction and projecting in radial direction.

To secure the ring segments against axial displacement, in accordance with an added feature of the invention, the ring segments are wider than the rotor discs associated therewith and are formed at axial ends thereof with respective projections embracing the radially inner edge of the respective rotor discs.

In accordance with another alternate feature of the invention, shaft collars are disposed on the tie-rod at opposite axial ends of the segments respectively, for securing the ring segments against axial displacement.

In accordance with yet another alternate feature of the invention, the damping elements have an axial width smaller than that of the rotor discs, and the rotor discs are formed at the radially inner peripheral surface thereof with a circular slot having the width of one of the ring segments for securing the damper elements, respectively, against axial displacement.

In accordance with an additional feature of the invention, the rotor discs are formed at an end face and on the inner periphery thereof with mutually adjoining circular recesses disposed in stepped relationship to one another for receiving therein sections of the damping elements formed with the contact surfaces, the damping elements having free end positions, respectively, containing the center of gravity of the respective damping elements, the free end portions projecting in radial direction out of the rotor discs.

In accordance with a concomitant feature of the invention, one of the damping elements is a closing ring segment and has end faces in peripheral direction thereof extending mutually parallel with adjacent end faces of respective ring segments disposed in peripheral direction at opposite ends of the closing ring segment.

Other features which are considered as characteristic for the invention are set forth in the appended claims.

Although the invention is illustrated and described herein as embodied in a device for damping vibrations in rotors of turbomachines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a cross-sectional view of the ring slot between tie rod and rotor disc with suitably disposed damping elements according to the invention;

FIG. 2 is an enlarged fragmentary view of FIG. 1;

Figure 3:
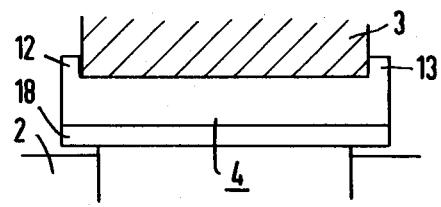
FIGS. 3 to 5 are cross-sectional views of FIG. 2 showing different embodiments for securing the damping elements against axial displacement.

Referring now to the drawing and first, particularly, to the cross-sectional view of FIG. 1, eight damping elements 4, for example, are shown disposed in a ring slot 1 between a tie rod 2 and a rotor disc 3, associated therewith, the damping elements 4, respectively, having nearly the form of a ring segment and having, over the major part of the length thereof, a height that is smaller than the width of the ring slot 1. The details of such a damping element 4 may be more readily apparent in FIG. 2. In the vicinity of one end thereof, the damping element 4 has, at an inner peripheral or circumferential surface 5 thereof, a radial extension 6 which extends over the axial width thereof and forms a contact surface 7 with the tie rod 2. At an outer circumferential surface 8, of the damping element 4, a radial extension 9 is provided, which forms a contact surface 10 with the rotor disc 3. For the damping element 4 to function, it is essential that the two contact surfaces 7 and 10 be located on one side of the damping element 4 beyond the region of the center of gravity 11. The contact pressure or forces may be calculated by a simple application of the laws of equilibrium of the forces and moments. If the geometry is selected so that the distance b of the center of gravity 11 from the radially outwardly directed contact surface 10 is greater than the distance a between the middle of both of the contact surfaces 7 and 10, then the two contact forces $P_7$ and $P_{10}$ at those contact surfaces 7 and 10, respectively, are greater than the centrifugal force $P_F$ acting upon the center of gravity 11. When the machine is in operation, the damping element 4 is rotated by the action of centrifugal force practically about the contact surface 10, so that firm contact of the damping element 4 both at the rotor disc 3 as well as at the tie rod 2 is always assured. Since the centrifugal acceleration is then very much greater than the acceleration due to gravity, very large contact pressures or forces can be obtained with a comparatively small weight of the damping elements 4. Through uniform distribution of these damping elements 4 over the circumference of the tie rod 2, the individual forces can act upon the tie rod 2 in such a manner that the resultant force remains small. The damping effect is produced in the contact surfaces 7 and 10 by the friction forces generated at each relative movement between the tie rod 2 and the rotor disc 3. Different slots or slots varying due to manufacturing tolerances, expansions during operation and wear are automatically compensated for or equalized by rotation of the damping elements 4. Also, axial displacements between the rotor disc 3 and the tie rod 2 during assembly and during operation are not impeded. In addition, defined contact forces in both contact surfaces 7 and 10 are maintained also when the rotary speed is reduced.

It is advantageous to narrow down the damping elements 4 toward the free end thereof in such a manner that a radial gap $\epsilon$ increasing toward the free end is produced only on the upper side 8 of the ring segment i.e. that the outer circumferential surface 8 extends at a slight inclination. This radial play $\epsilon$ can be of such dimension that the sum of all occurring slot variations due to manufacturing tolerances, non-stationary thermal expansions, centrifugal expansion, transverse contraction, deformation and wear is automatically compensated for or equalized by a corresponding rotation of the damping elements 4.

Several possibilities are available for ensuring against axial displacement and dislodging or falling out of the damping elements 4. According to FIG. 3, the damping elements 4, for example, have a greater width than the corresponding rotor disc 3 and laterally extend around the rotor disc 3 with radial extensions 12 and 13 at the end faces thereof.

Figure 4:
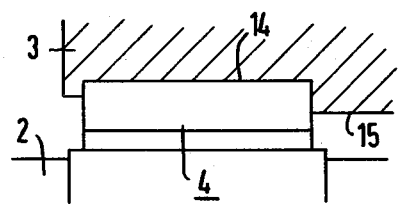

According to the embodiment of the invention shown in FIG. 4, the damping elements 4, however, have less width than the corresponding rotor disc 3 and are inserted into a circular slot 14 formed at the inner circumference or periphery 15 of the rotor disc 3.

Figure 5:
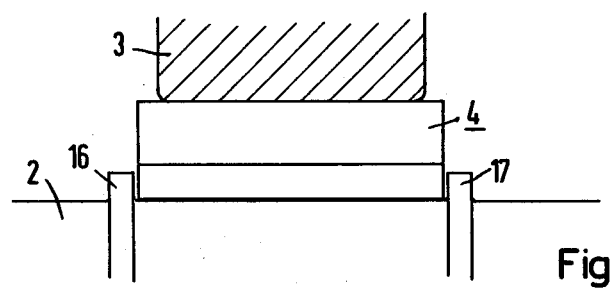

Finally, it is also possible, according to the embodiment of FIG. 5, for the tie rod 2 to be provided, laterally of the damping elements 4, with shaft collars 16 and 17 which prevent axial displacement of the damping elements 4.

Figure 6:
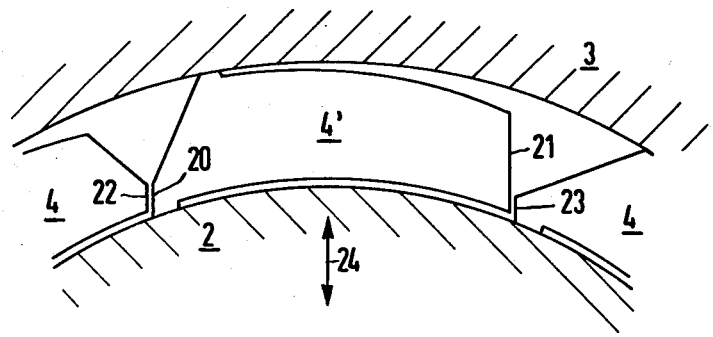
FIG. 6 is a view similar to that of FIG. 2 of yet another embodiment of one of the damping elements which facilitates assembly and disassembly.

Customarily, these damping elements 4 are first placed into the inner bore formed in the rotor disc 3, the damping elements 4 having radially extending end faces 18 and 19 (FIG. 2). Advantageously, a closing element 4', such as is shown in FIG. 6, is provided, however, with end faces 20 and 21 having parallel flanks, the adjoining end faces 22 and 23 of the adjacent elements 4 being also parallel to one another, so that this element 4' can be inserted, in accordance with the indicated arrow 24, if all of the other elements 4 are already disposed in the disc 3. Thereby, the total play required in circumferential direction can be limited to the amount required for free movement of the damping elements 4, 4', so that practically no imbalance can result from a displacement of these elements 4, 4'.

Figure 7:
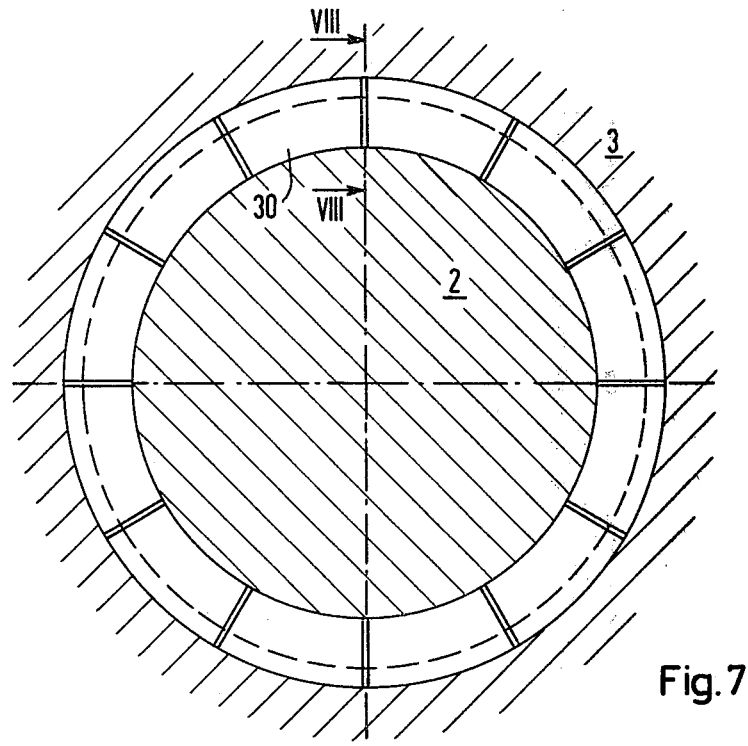
FIG. 7 is a view similar to that of FIG. 1 showing a ring slot with yet a further embodiment of the damping elements.
Figure 8:
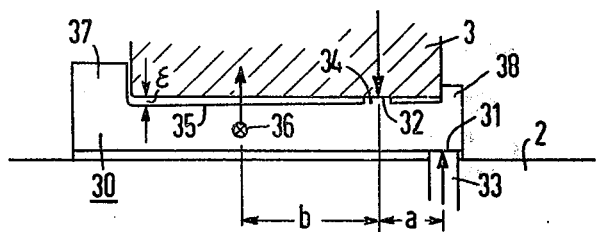
FIG. 8 is an enlarged fragmentary longitudinal sectional view of FIG. 7 taken along the line VIII—VIII in direction of the arrows.
Figure 9:
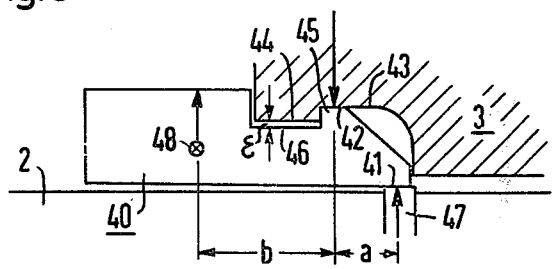
FIG. 9 is a view similar to that of FIG. 8 of yet another damping element according to the invention.

Further basic embodiments of the damping elements 30, 40 are shown in FIGS. 7 to 9. Contact surfaces 31 and 32 of the damping elements 30, which are also constructed in the form of ring segments, do not, however, extend in axial direction as in the embodiment of FIG. 2, but rather in circumferential direction of the ring slot. The radially inner contact surface 31 is formed by a collar 33, provided on the tire rod 2 and engaging one end of the damping element 30, while the radially outer contact surface 32 is formed by a radial projection 34 located at the outer circumferential surface 35 of the damping element 30. In this embodiment of FIGS. 7 and 8, too, the contact surfaces 31 and 32 are located to one side on the damping element 30 beyond the region of the center of gravity 36, and have a geometry such that the distance b of the center of gravity 36 from the middle of the radially outer contact surface 32 is greater than the distance a between the middle of the two contact surfaces 31 and 32.

Thus, firm contact of the two surfaces 31 and 32 with the tie rod 2 and the rotor disc 3, respectively, is provided in the embodiment of FIGS. 7 and 8, too, due to the action of centrifugal force when the machine is in operation. To secure the damping elements 30, against axial displacement, they also have at the ends thereof radially outwardly projecting extensions 37 and 38 which embrace the rotor disc 3 at the inner circumference or periphery thereof. The outer circumferential surface 35 of the damping elements 30, like those of the aforedescribed embodiments, are formed with an inclination extending downwardly toward the free end thereof, so that a radial slot ε of increasing magnitude is produced so as to afford automatic compensation or equalization of any slot variations.

In the embodiment shown in FIG. 9, the damping element 40 is held within the rotor disc 3 practically only at the region of the two contact surfaces 41 and 42. This rotor disc 3 has steplike indentations or undercuts 43 and 44, formed therein, a projection 45 located at the outer circumference or periphery 46 of the damping element 40 being held in the enlarged slot at the undercut 43, and the forward end of the damping element 40 lying, on a collar 47 formed in the tie rod 2. The center of gravity 48 of this damping element 40 is located beyond the rotor disc 3, so that, in this embodiment of FIG. 9, also, defined forces are applied to the contact surfaces 41 and 42 when the machine is in operation. Between the undercut or indentation 44 and the circumferential or peripheral surface 46 of the damping element 40, the radial gap ε is located which becomes increasingly enlarged in axial direction and serves for compensating for or equalizing slot variations automatically.

With the hereinafore-described damping elements and the disposition thereof in the ring slot between the tie rod and the rotor discs, accurately determinable centrifugal force-dependent contact pressures or forces are produced without any deformation, however, of the damping elements and always, therefore, having the same, solely speed-dependent magnitude during variation of the slot widths.

There are claimed:

1. In a device for damping vibrations in a rotating turbomachine rotor formed of an assembly of a plurality of centrally apertured rotor discs force-lockingly clamped together by a tie-rod passing through the apertures of the rotor discs and damping elements disposed in a ring slot formed between the tie-rod and the inner periphery of the rotor discs, the damping elements being actuatable for damping vibrations in the rotor in dependence upon centrifugal force generated by the rotating rotor, the improvement wherein the damping elements are formed of ring segments uniformly distributed peripherally in the ring slot and having discrete, strip-like contact surfaces at radially inner and outer peripheral surfaces thereof, said contact surfaces being in contact with the tie-rod and the rotor discs, respectively, said contact surfaces being spaced from one another in longitudinal direction of the respective damping elements and in a region of the respective damping elements beyond which the center of gravity of the respective damping elements is located.

2. Device according to claim 1 wherein said contact surfaces are spaced apart a distance smaller than the distance at which the center of gravity of the damping element is spaced from the radially outer contact surface.

3. Device according to claim 1 wherein the damping elements narrow down to a free end thereof so that, solely at an upper side of the damping elements, a radial gap increasing in width toward said free end is formed between the damping elements and the rotor discs.

4. Device according to claim 1 wherein said contact surfaces are formed by extensions projecting in radial direction and extending over the width of the respective damping elements, said extensions being offset from one another in peripheral direction of the respective damping elements, the radially inner extension being spaced from the center of gravity a greater distance than is the radially outer extension.

5. Device according to claim 1 wherein said contact surfaces extend in peripheral direction of the damping elements and are formed at the radially inner side of the respective damping elements by an encircling collar on the tie-rod disposed at one end of the respective damping elements, and at the radially outer side of the respective damping elements by a projection extending in peripheral direction and projecting in radial direction.

6. Device according to claim 1 wherein said ring segments are wider than the rotor discs associated therewith and are formed at axial ends thereof with respective projections embracing the radially inner edge of the respective rotor discs.

7. Device according to claim 1 including respective shaft collars disposed on the tire-rod at opposite axial ends of said ring segments respectively, for securing said ring segments against axial displacement.

8. Device according to claim 1 wherein the damping elements have an axial width smaller than that of the rotor discs, and said rotor discs are formed at the radially inner peripheral surface thereof with a circular slot having the width of one of the ring segments for securing the damper elements, respectively, against axial displacement.

9. Device according to claim 1 wherein the rotor discs are formed at an end face and on the inner periphery thereof with mutually adjoining circular recesses disposed in stepped relationship to one another for receiving therein sections of the damping elements formed with said contact surfaces, the damping elements having free end portions, respectively, containing the center of gravity of the respective damping elements, said free end portions projecting in radial direction out of the rotor discs.

10. Device according to claim 1 wherein one of said damping elements is a closing ring segment and has end faces in peripheral direction thereof extending mutually parallel with adjacent end faces of respective ring segments disposed in peripheral direction at opposite ends of said closing ring segment.

* * * * *